United States Patent
Formanek et al.

(10) Patent No.: US 10,754,702 B2
(45) Date of Patent: Aug. 25, 2020

(54) TECHNIQUE FOR RECONFIGURING A VIRTUAL MACHINE

(71) Applicant: Telefonaktiebolaget LM Ericsson (publ), Stockholm (SE)

(72) Inventors: Bence Formanek, Budapest (HU); Gergely Pongrácz, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 227 days.

(21) Appl. No.: 15/751,178

(22) PCT Filed: Aug. 18, 2015

(86) PCT No.: PCT/EP2015/068940
§ 371 (c)(1),
(2) Date: Feb. 8, 2018

(87) PCT Pub. No.: WO2017/028907
PCT Pub. Date: Feb. 23, 2017

(65) Prior Publication Data
US 2018/0239648 A1    Aug. 23, 2018

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 9/5072* (2013.01); *G06F 2009/4557* (2013.01); *G06F 2009/45595* (2013.01)

(58) Field of Classification Search
CPC .......................... G06F 9/45558; G06F 9/5072
USPC ............................................................ 718/1
See application file for complete search history.

(56) References Cited

U.S. PATENT DOCUMENTS

| | | | | |
|---|---|---|---|---|
| 9,983,807 | B1* | 5/2018 | Tylik | G06F 3/0665 |
| 10,089,128 | B2* | 10/2018 | Shih | G06F 11/0793 |
| 10,579,403 | B2* | 3/2020 | Antony | G06F 9/5077 |
| 2008/0209016 | A1* | 8/2008 | Karve | H04L 41/00 709/221 |
| 2011/0055398 | A1* | 3/2011 | Dehaan | G06F 9/5077 709/226 |

(Continued)

FOREIGN PATENT DOCUMENTS

WO        2014066820 A2    5/2014

*Primary Examiner* — Hiren P Patel
(74) *Attorney, Agent, or Firm* — Patent Portfolio Builders, PLLC

(57) ABSTRACT

A technique for reconfiguring a virtual machine in a cloud computing environment is disclosed. A method implementation of the technique comprises receiving (S310) a reconfiguration request from an application (110) being executed on the virtual machine in the cloud computing environment, the reconfiguration request indicating a desired resource allocation for the virtual machine, sending (S312) a reconfiguration response to the application (110), the reconfiguration response including a reconfiguration offer indicating a possible resource allocation for the virtual machine, receiving (S316) a reconfiguration acknowledgement from the application (110) indicating acceptance of the reconfiguration offer, and triggering (S318) reconfiguration of the virtual machine so as to allocate resources to the virtual machine according to the accepted reconfiguration offer.

16 Claims, 4 Drawing Sheets

(56) References Cited

U.S. PATENT DOCUMENTS

| | | | |
|---|---|---|---|
| 2012/0096457 A1* | 4/2012 | Gupta | G06F 9/45558 |
| | | | 718/1 |
| 2012/0158923 A1* | 6/2012 | Mohamed | G06F 9/5077 |
| | | | 709/220 |
| 2013/0061227 A1* | 3/2013 | Diehl | G06F 9/461 |
| | | | 718/1 |
| 2014/0215459 A1* | 7/2014 | Tsirkin | G06F 9/45558 |
| | | | 718/1 |
| 2014/0222889 A1* | 8/2014 | Bello | H04L 29/06537 |
| | | | 709/202 |
| 2014/0258446 A1* | 9/2014 | Bursell | G06F 15/177 |
| | | | 709/217 |
| 2014/0282518 A1* | 9/2014 | Banerjee | G06F 9/45533 |
| | | | 718/1 |
| 2014/0380307 A1* | 12/2014 | Zhu | G06F 9/45533 |
| | | | 718/1 |
| 2015/0334040 A1* | 11/2015 | Crowell | H04L 12/6418 |
| | | | 709/226 |
| 2017/0132044 A1* | 5/2017 | Kaneko | G06F 3/061 |

\* cited by examiner

TECHNIQUE FOR RECONFIGURING A VIRTUAL MACHINE

TECHNICAL FIELD

The present disclosure generally relates to cloud computing. In particular, a technique for reconfiguring a virtual machine in a cloud computing environment is presented. The technique may be embodied in methods, computer programs, apparatuses and systems.

BACKGROUND

In recent years, cloud computing has evolved as a general concept for providing users with access to remote computing and storage resources. Cloud computing generally involves the provision of an abstraction to computing infrastructure which comprises large groups of networked remote servers, typically (but not necessarily) provided in a data center.

Cloud computing services, such as Software as a Service (SaaS), are commonly realized using virtualization technologies. Virtualization allows one or more virtual machines to be executed on a single physical computing unit, such as a server or server blade. Virtual machines are logically separated from each other and share processor, memory and/or network resources of the underlying computing unit. So-called hypervisors, also known as Virtual Machine Managers (VMM), are employed on the computing units for the allocation of hardware resources to the virtual machines executed thereon. An operating system may be installed on each virtual machine, just like on a physical machine, which may be used to execute application programs thereon.

A cloud infrastructure management system typically decides on the allocation of virtual machines to the physical computing units available in the cloud computing environment. If an allocation needs to be changed, virtual machines may be migrated from one computing unit to another. Migration may be performed on virtual machines while their execution continues (so-called "live migration"), or may require shutting down (so-called "cold migration") or suspending (so-called "warm migration") a respective virtual machine on one computing host and restarting the virtual machine on another computing host. Cold migration and warm migration may also be summarized by the term "offline migration".

Virtualization of physical hardware resources provides numerous benefits. For example, virtualization allows multiplexing of resources across applications and enables for application isolation. Another advantage of employing virtualization is the ability to map resources to virtual machines or a group of virtual machines in a flexible manner in order to handle dynamically changing workloads. A workload increase, for example, may be handled by increasing the resources allocated to a virtual machine (so-called "scale up") or by increasing the number of virtual machines while the virtual machines themselves continue to work on the same workload (so-called "scale out").

For the scale out approach, load balancers are typically employed to distribute the workload among the virtual machines. The scale out approach is best suited to well-parallelizable workloads that can be divided into independent work units and that require none or only few communications between the respective virtual machines.

For the scale up approach, current techniques typically apply basic virtual machine and/or operating system level performance metrics to handle workload dynamics.

According to one such scale up technique, an optimization agent running on a virtual machine monitors resource usage. The agent may suggest configuration changes to a user and, based on a user response, the agent may inform the cloud management system to adjust resource allocation to the virtual machines accordingly.

According to another technique, the workload is measured by external observation of the virtual machines and, additionally, by observing operating system level statistics. Reconfiguring a virtual machine is decided based on the observed statistics and handled by live migration in case resources are not sufficient on the underlying computing host.

According to yet another technique, a host controller obtains virtual machine configuration data and, in response to an update of the computing host or an update of the operating system installed thereon, the host controller identifies the supported virtual hardware resources and updates the corresponding virtual machine with an optimized configuration.

In a Network Functions Virtualization (NFV) system, reconfiguration is handled by workload measurement-based scaling that supports three scaling categories: auto-scaling, on-demand scaling and management request. In auto-scaling, a manager entity monitors a Virtual Network Function (VNF) and triggers the scaling when certain conditions are met. In on-demand scaling, the VNF itself triggers the scaling through an explicit request to the manager entity. In management request, the reconfiguration is initiated by a cloud operator.

In each of these approaches, measured workload data only provides information about past resource usage and, accordingly, future resource requirements can only be estimated. Past and estimated future resource usage then forms the basis for the decision on how scaling is to be performed. In some cases, however, such estimation is not adequate to properly reflect future resource usage and, therefore, current techniques are not always capable of appropriately handling dynamic workloads.

SUMMARY

Accordingly, there is a need for a technique that permits improved handling of dynamically changing workloads on a virtual machine in a cloud computing environment.

According to a first aspect, a method for triggering reconfiguration of a virtual machine in a cloud computing environment is provided. The method comprises receiving a reconfiguration request from an application being executed on a virtual machine in the cloud computing environment, the reconfiguration request indicating a desired resource allocation for the virtual machine, sending a reconfiguration response to the application, the reconfiguration response including a reconfiguration offer indicating a possible resource allocation for the virtual machine, receiving a reconfiguration acknowledgement from the application indicating acceptance of the reconfiguration offer, and triggering reconfiguration of the virtual machine so as to allocate resources to the virtual machine according to the accepted reconfiguration offer.

The method may be performed by a resource controller configured to control resource allocation to virtual machines in the cloud computing environment. The resource controller may be part of a cloud infrastructure management system.

As referred to herein, a resource allocation for the virtual machine may comprise an assignment of hardware resources to the virtual machine. The hardware resources may be provided by the physical computing unit on which the virtual machine is executed (hereinafter denoted as "underlying computing unit"). A resource allocation may thus comprise a mapping of hardware components of the underlying computing unit or subcomponents/portions thereof to virtual hardware components which are provided to the virtual machine. This mapping may be managed by a hypervisor executed on the underlying computing unit and having control of the virtual machine. The virtual machine may operate based on these virtual hardware components and use them to execute an operating system which, in turn, may be used to execute the application therein. Hardware resources allocated to the virtual machine may comprise one or both of processor and memory resources, for example, but are not limited thereto.

Alternatively or additionally, a resource allocation for the virtual machine may comprise software resources. For example, a virtual switch (implemented as a software component on the underlying computing unit) may be provided to the virtual machine in order to provide support for network connectivity. Still alternatively or additionally, a resource allocation for the virtual machine may comprise logical resources, such as, for example, real-time scheduling parameters for the virtual machine controlled by the hypervisor. It will be understood that these examples for software resources and logical resources are not limiting and that a variety of further such resources are conceivable to be configured for the virtual machine.

The desired resource allocation may be selected by the application so as to optimize execution of the application on the virtual machine. To this end, the application may determine the desired resource allocation based on knowledge about its own upcoming execution. The desired resource allocation may comprise one or more resource items which are desired to be allocated to the virtual machine. The resource items may comprise at least one of a hardware resource, a software resource and a logical resource. In case of hardware resources, for example, a resource item may comprise at least one of a processor resource and a memory resource. A processor resource may, for example, be a processor (or a core thereof), preferably supporting a certain speed, and a memory resource may, for example, be a certain amount of random-access memory (RAM) or hard disk memory. In case of software resources, for example, a resource item may comprise an interface provided by a virtual switch, preferably supporting a certain bandwidth.

The desired resource allocation may define resources additional to a current resource allocation for the virtual machine in order to increase the resources allocated to the virtual machine. For example, as compared to the current resource allocation, the desired resource allocation may indicate that another processor core is desired for the execution of the application on the virtual machine. Alternatively, the desired resource allocation may comprise fewer resources than the current resource allocation for the virtual machine in order to release resources allocated to the virtual machine. This may be the case when such resources are not needed anymore for the execution of the application on the virtual machine.

When sending the reconfiguration response to the application, including a reconfiguration offer in the reconfiguration response may depend on certain conditions. Thus, only when one or more of such conditions are satisfied, the reconfiguration offer may be included into the reconfiguration response. Otherwise, the reconfiguration response may indicate that the desired resource allocation is not possible. In this case, the subsequent method steps of receiving a reconfiguration acknowledgment from the application and triggering reconfiguration of the virtual machine may be omitted.

According to one such condition, the reconfiguration response may conditionally include the reconfiguration offer when resources for satisfying the desired resource allocation are available at least in part. Thus, a possible resource allocation may fully correspond to the desired resource allocation or may comprise a portion of the resource items included in the desired resource allocation. In order to determine whether resources satisfying the desired resource allocation (fully or at least in part) are available on a computing unit in the cloud computing environment, a virtual machine configuration database may be queried which is configured to store information about resources currently allocated to virtual machines in the cloud computing environment.

According to another condition, the reconfiguration response may conditionally include the reconfiguration offer when the desired resource allocation does not exceed a predetermined maximum (or fall below a predetermined minimum) amount of resources. The predetermined maximum (or minimum) amount of resources may be given by a physical limit, e.g., a limit defined by available hardware resources of a respective computing unit, or may be defined by a user.

According to yet another condition, the reconfiguration response may conditionally include the reconfiguration offer when the application has a right to initiate reconfiguration of the virtual machine. Such right may, for example, depend on an operating system level right of the application being executed on the virtual machine.

In certain variants, the reconfiguration request may indicate a desired reconfiguration scheme for reconfiguring the virtual machine. The desired reconfiguration scheme may correspond to one of a runtime reconfiguration, a live migration, and an offline migration of the virtual machine.

Also, in certain variants, the reconfiguration offer may further indicate a possible reconfiguration scheme for reconfiguring the virtual machine. The possible reconfiguration scheme may likewise correspond to one of a runtime reconfiguration, a live migration, and an offline migration of the virtual machine. The possible reconfiguration scheme may be selected to conform to the desired reconfiguration scheme.

The possible reconfiguration scheme may be selected based on determining whether sufficient resources are available on a respective computing unit in the cloud computing environment. Runtime reconfiguration may be selected as the possible reconfiguration scheme if it is determined that sufficient resources on the underlying computing unit are available. Otherwise, a destination computing unit different from the underlying computing unit and having sufficient resources may be determined in the cloud computing environment and a live migration or offline migration may be selected as the possible reconfiguration scheme accordingly.

If the possible reconfiguration scheme corresponds to a runtime reconfiguration, triggering reconfiguration of the virtual machine may include instructing a hypervisor having control of the virtual machine to allocate resources to the virtual machine according to the accepted reconfiguration offer. In this case, the virtual machine may remain on the underlying computing unit, i.e., not being subject to a migration.

If the possible reconfiguration scheme corresponds to a live migration, on the other hand, triggering reconfiguration of the virtual machine may include instructing a hypervisor having control of the virtual machine to perform live migration of the virtual machine to transfer control of the virtual machine to a destination hypervisor, and instructing the destination hypervisor to allocate resources to the virtual machine according to the accepted reconfiguration offer. Similarly, if the possible reconfiguration scheme corresponds to an offline migration, triggering reconfiguration of the virtual machine may include instructing a hypervisor having control of the virtual machine to perform offline migration of the virtual machine to transfer control of the virtual machine to a destination hypervisor, and instructing the destination hypervisor to allocate resources to the virtual machine according to the accepted reconfiguration offer. In both cases, the destination hypervisor may be executed on the destination computing unit that has been determined as having sufficient resources available to satisfy the desired resource allocation (fully or at least in part). Offline migration may be performed either as a cold migration or as a warm migration.

In certain variants, the method may further comprise storing information about the resources allocated to the virtual machine according to the accepted reconfiguration offer into a virtual machine configuration database configured to store information about resources currently allocated to virtual machines in the cloud computing environment. In some variants, this may allow collecting data required for determining whether resources satisfying the desired resource allocation (fully or at least in part) are available on a computing unit in the cloud computing environment.

Triggering reconfiguration of the virtual machine may generally be initiated by the application. In another implementation, triggering reconfiguration of the virtual machine may be initiated by another entity, such as, for example, the resource controller. To this end, the method may comprise sending, prior to receiving the reconfiguration request, a notification to the application indicating a resource availability change. The notification may include a suggested resource allocation for the virtual machine. In some variants, the suggested resource allocation may be treated in the same manner as the possible resource allocation described herein. In such a case, the notification may be taken as a reconfiguration offer indicating the suggested resource allocation for the virtual machine which may be accepted by the application in the same manner as described herein with regard to the possible resource allocation. The method steps of receiving a reconfiguration request from the application and sending a reconfiguration response to the application may be omitted in this case. Thus, receiving a reconfiguration request from the application and sending a reconfiguration response to the application may conditionally be performed when the notification does not include a suggested resource allocation.

According to a second aspect, a method for initiating reconfiguration of a virtual machine in a cloud computing environment is provided. The method is performed by an application being executed on a virtual machine in the cloud computing environment and comprises sending a reconfiguration request to a resource controller configured to control resource allocation to virtual machines in the cloud computing environment, the reconfiguration request indicating a desired resource allocation for the virtual machine, receiving a reconfiguration response from the resource controller, the reconfiguration response including a reconfiguration offer indicating a possible resource allocation for the virtual machine, and sending a reconfiguration acknowledgement to the resource controller indicating acceptance of the reconfiguration offer.

The method according to the second aspect defines a method from the application's perspective which may be complementary to the method according to the first aspect. As such, those aspects described with regard to the method of the first aspect which are applicable to the method of the second aspect may be comprised by the method of the second aspect as well. Unnecessary repetitions are thus omitted in the following.

Before sending the reconfiguration request, the application may determine the desired resource allocation for the virtual machine. To this end, the method according to the second aspect may comprise determining, prior to sending the reconfiguration request, a current local-level resource allocation for the virtual machine by querying an operating system in which the application is executed. The local-level resource allocation may include information on currently allocated virtual resources, such as, for example, virtual hardware components provided to the virtual machine by a hypervisor having control of the virtual machine. The reconfiguration request may then be generated on the basis of the current local-level resource allocation.

Alternatively or additionally, the method may comprise determining, prior to sending the reconfiguration request, a current cloud-level resource allocation relating to the virtual machine by querying a virtual machine configuration database configured to store information about resources allocated to virtual machines in the cloud computing environment. The cloud-level resource allocation may include information on resources currently allocated to the virtual machine on the cloud level and, therefore, may include information that cannot be collected on the local level through the operating system. Such information may only be accessible from outside of the virtual machine. The reconfiguration request may then be generated on the basis of the current cloud-level resource allocation.

As in the method of the first aspect, the reconfiguration request may indicate a desired reconfiguration scheme for reconfiguring the virtual machine. The desired reconfiguration scheme may correspond to one of a runtime reconfiguration, a live migration, and an offline migration of the virtual machine. Also, the reconfiguration offer received with the reconfiguration response may further indicate a possible reconfiguration scheme for reconfiguring the virtual machine. The possible reconfiguration scheme may likewise correspond to one of a runtime reconfiguration, a live migration, and an offline migration of the virtual machine.

Upon receiving the reconfiguration response from the resource controller, sending the reconfiguration acknowledgment to the resource controller may conditionally be performed depending on the possible reconfiguration scheme indicated in the reconfiguration offer. Thus, depending on the particular possible reconfiguration scheme, sending the reconfiguration acknowledgment to the resource controller may be omitted or not. If sending the reconfiguration acknowledgment is omitted, a notification may be sent to the resource controller indicating rejection of the reconfiguration offer.

If the possible reconfiguration scheme corresponds to a runtime configuration, the application may accept the reconfiguration offer and, thus, send the reconfiguration acknowledgment to the resource controller accordingly.

If the possible reconfiguration scheme corresponds to a live migration, the reconfiguration acknowledgement may conditionally be sent when all resources used by the application are migratable. The application may therefore check whether the resources used in the execution of the application may be migrated. Migratability may be given, for example, if the application only uses global resources provided at the cloud level. On the other hand, migratability may not be given, for example, if at least one of the used local resources cannot be migrated or cannot be migrated efficiently.

Further, if the possible reconfiguration scheme corresponds to an offline migration, the reconfiguration acknowledgement may conditionally be sent when the state of the application is restorable after suspension or shutdown of the virtual machine. The application may therefore check whether restorability is given and accept or reject the reconfiguration offer accordingly.

In one implementation, the method may comprise receiving, prior to sending the reconfiguration request, a notification from the resource controller indicating a resource availability change. The notification may include a suggested resource allocation for the virtual machine. In some variants, the suggested resource allocation may be treated in the same manner as the possible resource allocation described herein. In such a case, the notification may be taken as a reconfiguration offer indicating the suggested resource allocation for the virtual machine which may be accepted by the application in the same manner as described herein with regard to the possible resource allocation. The method steps of sending a reconfiguration request to the resource controller and receiving a reconfiguration response from the resource controller may be omitted in this case. Thus, sending a reconfiguration request to the resource controller and receiving a reconfiguration response from the resource controller may conditionally be performed when the notification does not include a suggested resource allocation.

According to a third aspect, a computer program product is provided. The computer program product comprises program code portions for performing the method of at least one of the first and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a resource controller for triggering reconfiguration of a virtual machine in a cloud computing environment is provided. The resource controller comprises at least one memory storing program code, and at least one processor configured to execute the program code, wherein the program code is configured to cause the at least one processor to receive a reconfiguration request from an application being executed on a virtual machine in the cloud computing environment, the reconfiguration request indicating a desired resource allocation for the virtual machine, send a reconfiguration response to the application, the reconfiguration response including a reconfiguration offer indicating a possible resource allocation for the virtual machine, receive a reconfiguration acknowledgement from the application indicating acceptance of the reconfiguration offer, and trigger reconfiguration of the virtual machine so as to allocate resources to the virtual machine according to the accepted reconfiguration offer.

According to a fifth aspect, a computing unit for initiating reconfiguration of a virtual machine in a cloud computing environment is provided. The computing unit comprises at least one memory storing program code, and at least one processor configured to execute the program code, wherein the program code belongs to an application being executed on a virtual machine in the cloud computing environment and the program code is configured to cause the at least one processor to send a reconfiguration request to a resource controller configured to control resource allocation to virtual machines in the cloud computing environment, the reconfiguration request indicating a desired resource allocation for the virtual machine, receive a reconfiguration response from the resource controller, the reconfiguration response including a reconfiguration offer indicating a possible resource allocation for the virtual machine, and send a reconfiguration acknowledgement to the resource controller indicating acceptance of the reconfiguration offer.

The resource controller according to the fourth aspect and the computing unit according to the fifth aspect may generally be configured to perform any of the methods and method steps presented herein.

According to a sixth aspect, there is provided a system comprising the resource controller of the fourth aspect and at least one computing unit of the fifth aspect.

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will partially be described in connection with exemplary cloud architectures, it will be appreciated that the present disclosure may also be practiced in connection with other cloud architectures and other cloud management approaches. Also, one skilled in the art will appreciate that the present disclosure refers to virtual machines as an example of virtualization technology, but is not limited thereto. Rather, one skilled in the art will appreciate that the present disclosure may be embodied in combination with other virtualization concepts of similar nature, such as containers, sandboxes or the like.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
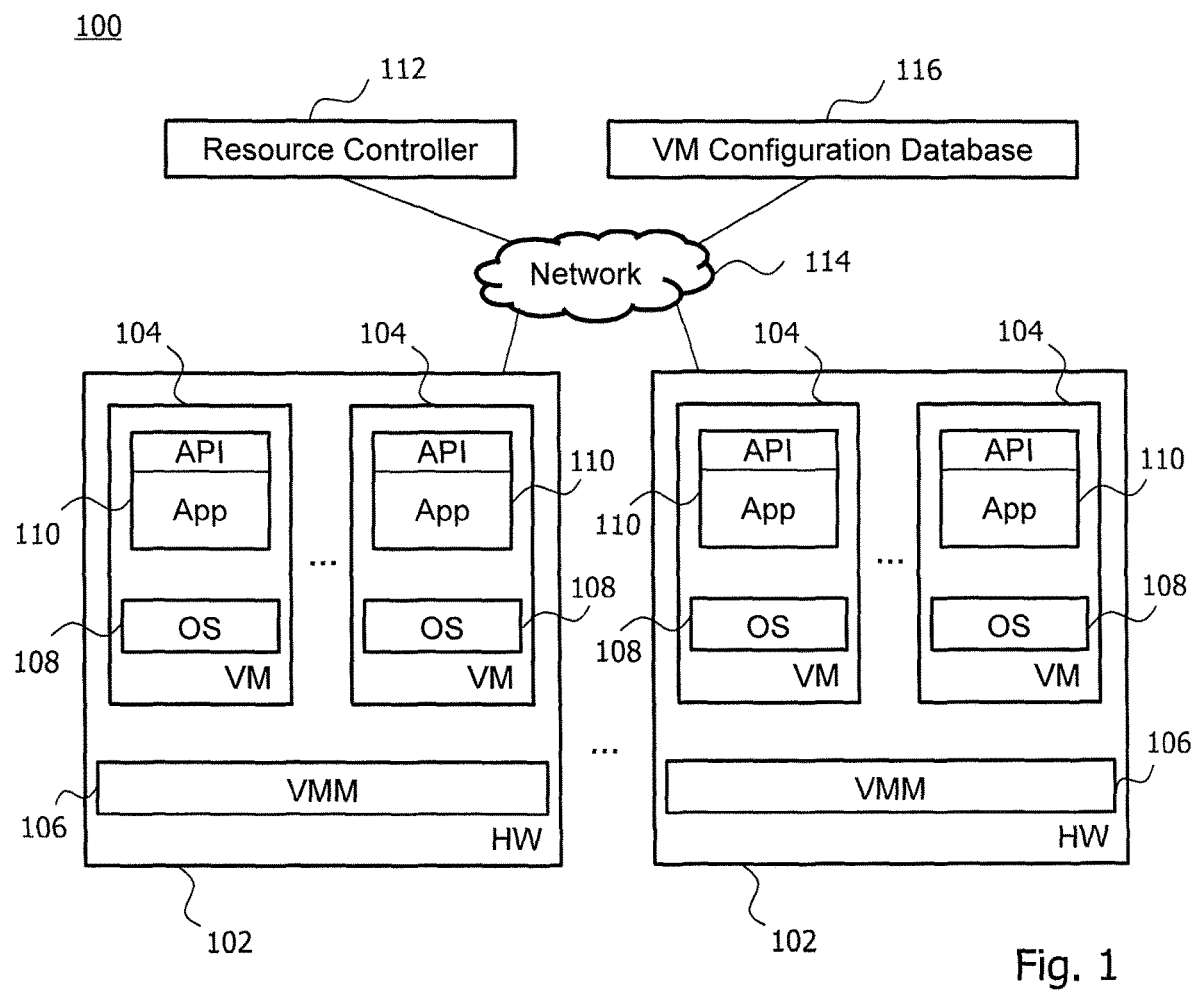
FIG. 1 schematically illustrates a cloud computing environment in which embodiments of the present disclosure may be performed.

FIG. 1 schematically illustrates a cloud computing environment 100 in which a plurality of computing units 102, e.g., physical servers or server blades, are provided. Each computing unit 102 hosts one or more virtual machines 104, each of which may access the resources of the respective underlying computing unit 102 through a hypervisor 106 (also called virtual machine manager, "VMM") so that several virtual machines 104 may share the resources of the same computing unit 102, e.g., its processor and memory resources. For each computing unit 102, allocation of the resources is managed by the hypervisor 106 which may assign dedicated portions of the available resources to the virtual machines 104 being executed thereon. On each virtual machine 104, an operating system 108 is installed which may be used to execute an application 110 therein (or several applications), thus, providing the application 110 (or the several applications) with access to the resources allocated to the respective virtual machine 104. Further, on each computing unit 102, a virtual switch (not shown) may be provided which may be used by the respective virtual machines 104 to establish network connectivity to other entities in the cloud computing environment 100.

The cloud computing environment 100 further comprises a resource controller 112. The resource controller 112 is configured to control resource allocation to the virtual machines 104 and may be part of a cloud infrastructure management system. The resource controller 112 may decide on instantiating virtual machines 104, terminating virtual machines 104 and migrating virtual machines 104 on and between the different computing units 102. Particularly, the resource controller 112 may decide on the allocation of hardware resources, software resources and logical resources to the virtual machines 104. The resource controller 112 may thus be said to handle the allocation of resources at the cloud level, rather than the hypervisors 106 which handle the allocation of resources at the local level. In order to implement a desired allocation, the resource controller 112 may communicate with a respective hypervisor 106 via a network 114 and instruct it to allocate resources to the respective virtual machine 104.

The cloud computing environment 100 further comprises a virtual machine configuration database 116 which stores detailed information about resources currently allocated to the virtual machines 104 in the cloud computing environment 100. The information stored in the virtual machine configuration database 116 may comprise information about the allocation of at least one of hardware resources, software resources and logical resources. In case of hardware resources, for example, the virtual machine configuration database 116 may store information about physical hardware resources of the respective computing units 102 and their mappings to respective virtual hardware components provided to the virtual machines 104. As an example, in a simultaneous multithreading (SMT) environment, the virtual machine configuration database 116 may store a mapping of a core of a physical multi-core processor of a respective computing unit 102 to a virtual processor assigned to a respective virtual machine 104. In case of software resources, for example, the virtual machine configuration database 116 may store information on the configuration of a virtual switch provided to a virtual machine 104. In case of logical resources, for example, the virtual machine configuration database 116 may store real-time scheduling parameters for a virtual machine 104 controlled by the corresponding hypervisor 106. It will be understood that these examples of hardware/software/logical resources are not limiting and that a variety of further information on such or other resources are conceivable to be stored in the virtual machine configuration database 116.

The resource controller 112 may query the virtual machine configuration database 116 in order to collect information required for determining whether resources satisfying a desired resource allocation for a respective virtual machine 104 are available on a computing unit 102 in the cloud computing environment 100. In the example of FIG. 1, the resource controller 112 and the virtual machine configuration database 116 are shown as separate entities which may establish connectivity to each other over the network 114. It will be understood, however, that the resource controller 112 and the virtual machine configuration database 116 may also be provided in the form of a single entity. Further, as shown in FIG. 1, each application 110 implements an application programming interface (API) which may be used to communicate with the resource controller 112 and the virtual machine configuration database 116 over the network 114.

Figure 2:
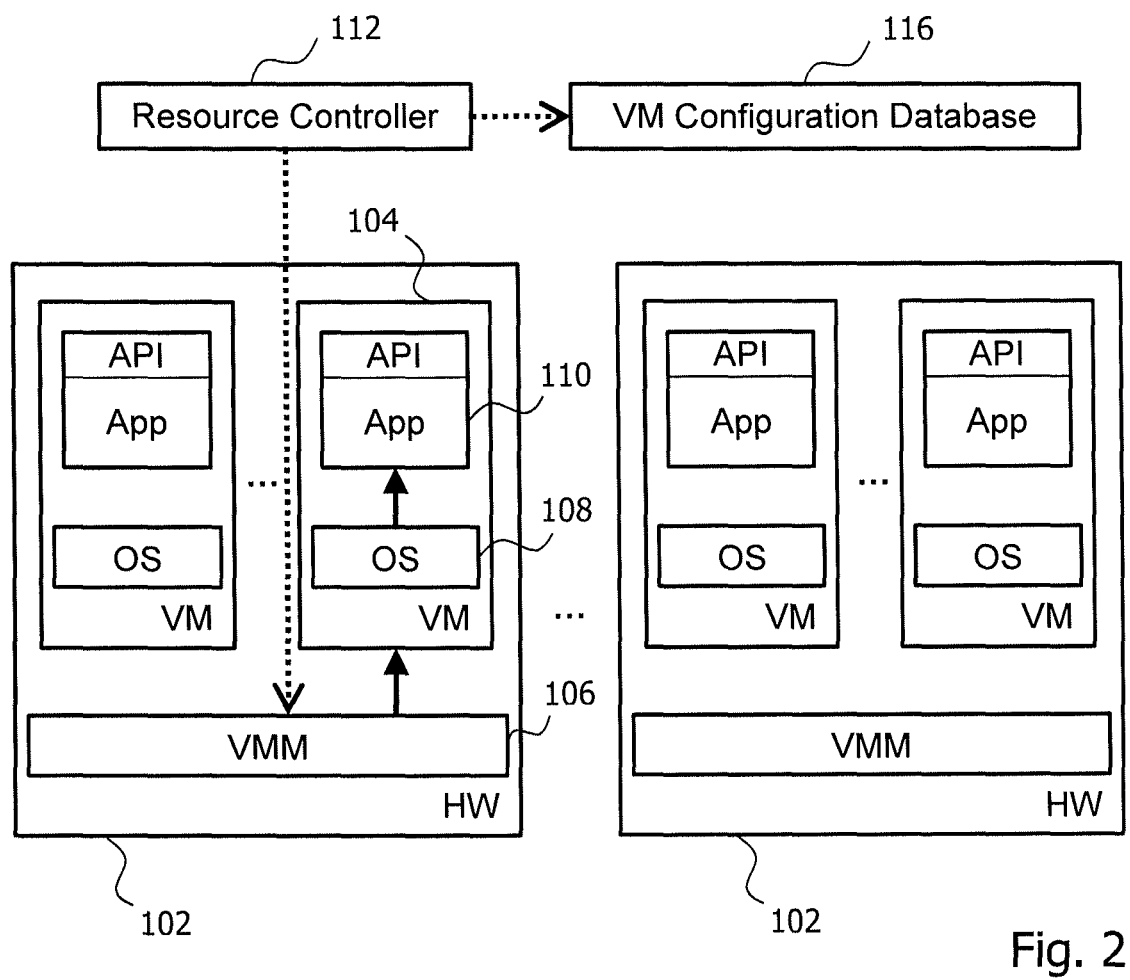
FIG. 2 illustrates communications performed between entities of the cloud computing environment of FIG. 1 when a virtual machine is newly instantiated.

FIG. 2 illustrates an embodiment of communications performed between the entities of the cloud computing environment 100 when a virtual machine 104 is newly instantiated.

When a virtual machine 104 is to be instantiated, the resource controller 112 may first determine a computing unit 102 in the cloud computing environment 100 that has sufficient free resources for instantiating the virtual machine 104 and may then instruct the hypervisor 106 of the corresponding computing unit 102 to instantiate the virtual machine 104 accordingly. Upon completion of the instantiation of the virtual machine 104, the resource controller 112 may store information about the resources allocated to the virtual machine 104 into the virtual machine configuration database 116. This is indicated by the dotted arrows in FIG. 2. The virtual machine 104 is thus started and the operating system 108 installed thereon is booted accordingly. The operating system 108 detects the virtual hardware configuration of the virtual machine 104 and configures itself accordingly. After that, the application 110 is started. This is indicated by the bold arrows in FIG. 2.

Figure 3:
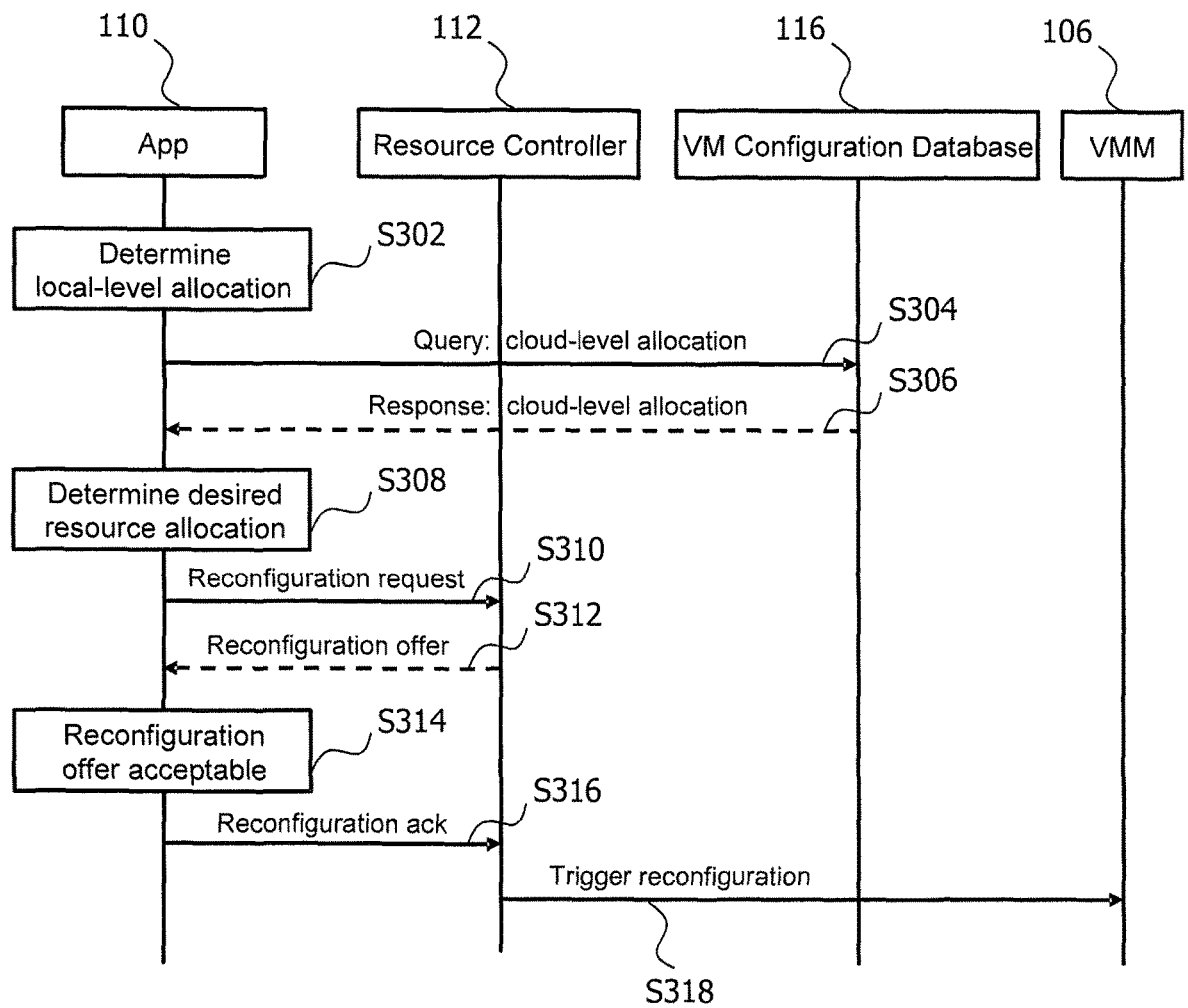
FIG. 3 illustrates a sequence diagram of a process for triggering reconfiguration of a virtual machine in the cloud computing environment of FIG. 1.

FIG. 3 illustrates a sequence diagram of an embodiment of a process for triggering reconfiguration of a virtual machine 104 in the cloud computing environment 100. In an initial state, the application 110 is executed with a current workload in the operating system 108 on the virtual machine 104. In expectation of a change in workload or upon a change in workload, the application 110 may want to optimize its execution on the virtual machine 104. As an example, the application 110 may have knowledge about an upcoming change of input data which it continuously receives. In case the input data changes to a more parallelizable format, processing of the input data may be accelerated by allocating more processor cores to the virtual machine 104.

Thus, as a first step of the process, the application 110 determines a current resource allocation for the virtual machine 104. This includes, in step S302, determining a current local-level resource allocation for the virtual machine 104 by querying the operating system 108 in which the application 110 is executed. The local-level resource allocation may include information on virtual resources currently allocated to the virtual machine 104, such as, for example, virtual hardware components provided to the virtual machine 104 by the corresponding hypervisor 106. Further, a current cloud-level resource allocation relating to the virtual machine 104 is determined by querying, in step S304, the virtual machine configuration database 116 and receiving, in step S306, a corresponding response from the virtual machine configuration database 116. The cloud-level resource allocation may include information on resources currently allocated in relation to the virtual machine 104 on the cloud level and, therefore, may include information that cannot be collected on the local level through the corresponding operating system 108 (i.e., such information may only be accessible from outside of the virtual machine 104).

Next, the application 110 determines, in step S308, a desired resource allocation. The desired resource allocation may be selected by the application 110 so as to optimize execution of the application 110 on the virtual machine 104. To this end, the application 110 may determine the desired resource allocation based on knowledge about its own upcoming execution. The desired resource allocation may comprise one or more resource items which, in turn, may comprise at least one of a hardware resource, a software resource and a logical resource. In case of hardware resources, for example, a resource item may comprise at least one of a processor resource and a memory resource. A processor resource may, for example, be a processor (or a core thereof), preferably supporting a certain speed, and a memory resource may, for example, be a certain amount of random-access memory (RAM) or hard disk memory. In case of software resources, a resource item may comprise an interface provided by a virtual switch, preferably supporting a certain bandwidth.

The application 110 may then check whether the current resource allocation matches the desired resource allocation. If the current resource allocation does not match the desired resource allocation and, therefore, execution of the application 110 may be optimized, the application 110 generates and sends, in step S310, a reconfiguration request indicating the desired resource allocation to the resource controller 112. Optionally, the reconfiguration request may also indicate a desired reconfiguration scheme for reconfiguring the virtual machine 104. The desired reconfiguration scheme may correspond to one of a runtime reconfiguration, a live migration, and an offline migration of the virtual machine 104. Upon receiving the reconfiguration request, the resource controller 112 determines whether resources satisfying the desired resource allocation (fully or at least in part) are available on the underlying computing unit 102 or on another computing unit 102 in the cloud computing environment 100. Optionally, the resource controller 112 may query the virtual machine configuration database 116 for corresponding information required for such determination (not shown in FIG. 3).

If the resource controller 112 determines that the desired resource allocation can be satisfied (fully or at least in part), it generates a reconfiguration offer indicating a possible resource allocation for the virtual machine 104 as well as indicating a possible reconfiguration scheme for reconfiguring the virtual machine 104. The possible reconfiguration scheme may correspond to one of a runtime reconfiguration, a live migration, and an offline migration of the virtual machine 104. The resource controller 112 may selected the possible reconfiguration scheme to conform to the desired reconfiguration scheme. The resource controller 112 may select the possible reconfiguration scheme based on determining whether sufficient resources are available on a respective computing unit 102 in the cloud computing environment 100. Runtime reconfiguration may be selected as the possible reconfiguration scheme if it is determined that sufficient resources on the underlying computing unit 102 are available. Otherwise, a destination computing unit 102 different from the underlying computing unit 102 and having sufficient resources may be determined and a live migration or offline migration may be selected as the possible reconfiguration scheme accordingly. Once the generation of the reconfiguration offer is complete, the resource controller 112 sends, in step S312, a reconfiguration response including the reconfiguration offer to the application 110.

Before sending the reconfiguration response, the resource controller 112 may optionally perform additional checks, such as determining whether the desired resource allocation exceeds a predetermined maximum amount of resources or whether the application 110 has a right to initiate reconfiguration of the virtual machine 104, and include the reconfiguration offer into the reconfiguration response only if these checks are successful.

The application 110 then examines the reconfiguration offer received and, if it determines the reconfiguration offer to be acceptable in step S314, the application 110 sends, in step S316, a reconfiguration acknowledgment to the resource controller 112 indicating acceptance of the reconfiguration offer. The resource controller 112, in turn, triggers reconfiguration of the virtual machine 104 in step S318 so that resources according to the accepted reconfiguration offer are allocated to the virtual machine 104.

Triggering reconfiguration of the virtual machine 104 may differ depending on the selected possible reconfiguration scheme. If the possible reconfiguration scheme corresponds to a runtime reconfiguration, triggering reconfiguration of the virtual machine 104 may include instructing the corresponding hypervisor 106 to allocate resources to the virtual machine 104 according to the accepted reconfiguration offer. If the possible reconfiguration scheme corresponds to a live migration or an offline migration, on the other hand, triggering reconfiguration of the virtual machine 104 may include instructing the hypervisor 106 to perform live/offline migration of the virtual machine 104 to transfer control of the virtual machine 104 to a destination hypervisor 106, and instructing the destination hypervisor 106 to allocate resources to the virtual machine 104 according to the accepted reconfiguration offer. The destination hypervisor 106 may be a hypervisor executed on the destination computing unit 102 which has been determined as having sufficient resources available to satisfy the desired resource allocation (fully or at least in part).

Once reconfiguring the virtual machine 104 is complete, the application 110 may detect the new resource allocation assigned to the virtual machine 104, e.g., through the corresponding operating system 108, and may adapt its execution to the newly available resources.

Figure 4:
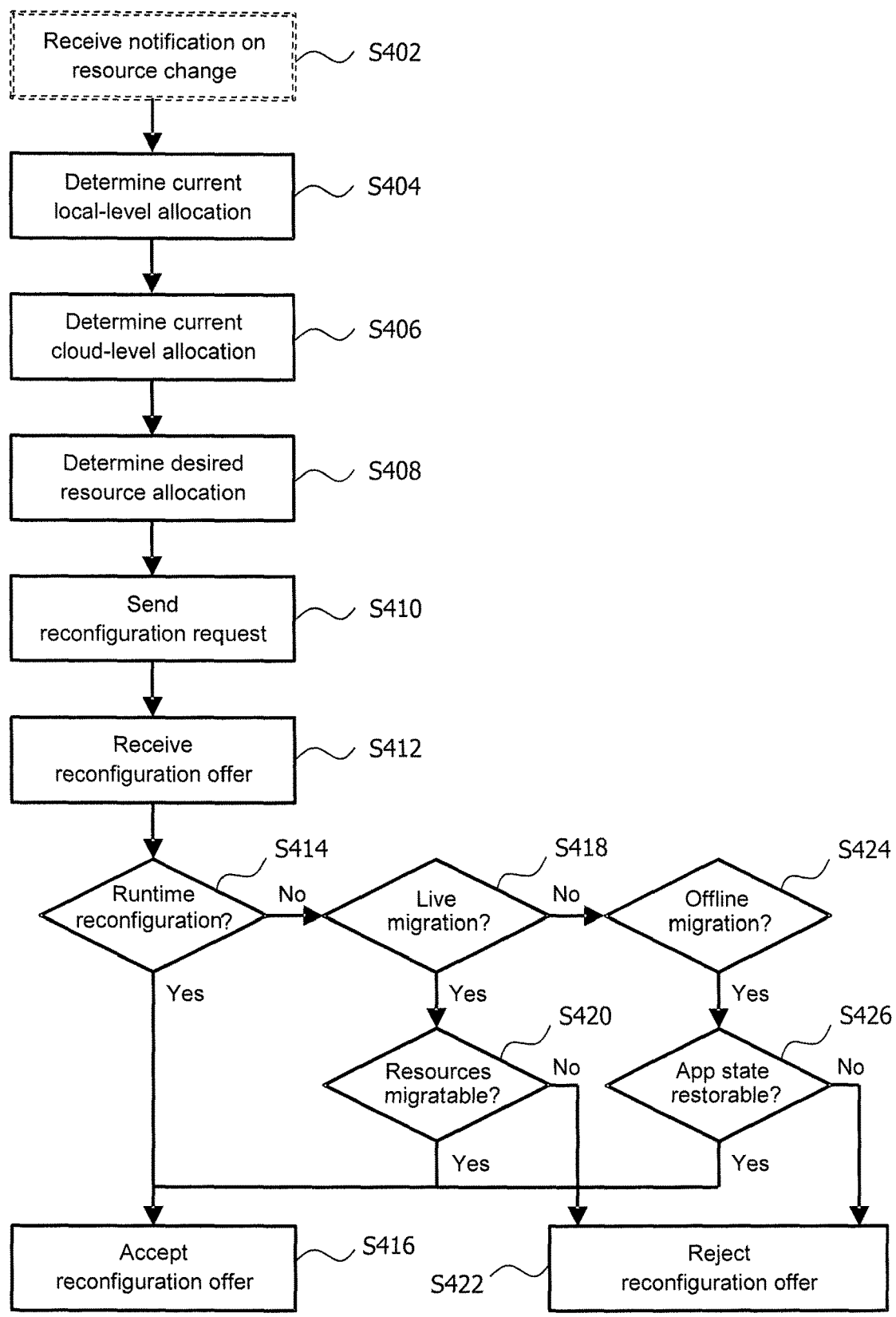
FIG. 4 illustrates a flowchart of a method which may be performed by an application being executed on a virtual machine in the cloud computing environment of FIG. 1.

FIG. 4 illustrates a flowchart of a method embodiment which may be performed by an application 110 that is executed on a virtual machine 104 in the cloud computing environment 100. In FIG. 4, steps S404 to S412 correspond to steps S302 to S312 of FIG. 3 and, therefore, a detailed description of these steps is omitted to avoid unnecessary repetitions.

Prior to step S404, an optional step S402 may be performed in which the application 110 receives a notification indicating a resource availability change from the resource controller 112. In this case, triggering reconfiguration of the virtual machine 104 is not initiated by the application 110, but by the resource controller 112. Further to indicating a resource availability change, the notification may also indicate a suggested resource allocation for the virtual machine 104. The notification may be sent by the resource controller 112 in exceptional events, for example, if excess resources become available (e.g., due to a low load in the cloud or due to a virtual machine shutdown), or if additional resources are required (e.g., for instantiating a new virtual machine or for scaling up a high priority application). In one variant (not depicted), the suggested resource allocation may be treated in the same manner as the possible resource allocation described below with regard to step S412. In this case, the notification may be taken as a reconfiguration offer indicating the suggested resource allocation for the virtual machine 104 which may be accepted by the application 110 in the same manner as described below with regard to the possible resource allocation in steps S414 to S426. Steps S410 and S412 may be omitted in this case.

After receiving the reconfiguration offer in step S412, the application 110 may determine whether the reconfiguration offer is acceptable or not. This may depend on the possible reconfiguration scheme indicated in the reconfiguration offer. The application 110 thus checks, in step S414, if the possible reconfiguration scheme corresponds to a runtime configuration. If this is the case, the application 110 accepts, in step S416, the reconfiguration offer and sends a reconfiguration acknowledgment to the resource controller 112 accordingly. Otherwise, the application 110 checks, in step S418, if the possible reconfiguration scheme corresponds to a live migration. If this is the case, the application 110 checks, in step S420, whether the resources used in the execution of the application 110 may be migrated. If this is the case, the application 110 accepts the reconfiguration offer in step S416 and, otherwise, rejects the reconfiguration offer in step S422. If, in step S418, the possible reconfiguration scheme does not correspond to a live migration, the application checks in step S424, if the possible reconfiguration scheme corresponds to an offline migration. If this is the case, the application 110 checks, in step S426, whether the state of the application 110 is restorable after suspension or shutdown of the virtual machine 104. If this is the case, the application 110 accepts the reconfiguration offer in step S416 and, otherwise, rejects the reconfiguration offer in step S422.

In the following, four exemplary implementations of a particular application 110 will be described in order to further elucidate the technique of the present disclosure.

In a first example, the application 110 is a video encoder that performs offline encoding. The video encoder 110 reads uncompressed video data from a local file (resource $F_1$), encodes the video data and writes the compressed video data to another local file (resource $F_2$). A first part of the video data is provided in Standard Definition (SD) resolution and a second part of the video data is provided in High Definition (HD) resolution.

It is assumed that the current allocation for the virtual machine 104 comprises two virtual processors (resources $P_1$, $P_2$). For processing the SD part of the video, the video encoder 110 may use two threads, each being executed on one of the two virtual processors. In this way, the video encoder 110 may perform the encoding in real time. For processing the HD part of the video, however, the application knows that four threads are required to keep the processing speed at real-time.

The video encoder 110 therefore sends a reconfiguration request to the resource controller 112 indicating a desired resource allocation comprising two additional virtual processors ($P_3$, $P_4$), thus, requesting an allocation of four processors ($P_1$, $P_2$, $P_3$, $P_4$) in total. In this example, the resource controller 112 replies with a reconfiguration offer which comprises four processors and which indicates a live migration as the possible possible reconfiguration scheme. The video encoder 110, in turn, determines that the local files ($F_1$, $F_2$) are too large to be migrated efficiently (i.e., these files are not transferrable efficiently enough for live migration). The video encoder 110 thus determines that not all resources it uses are migratable and rejects the reconfiguration offer accordingly.

In order to check if another resource allocation is available to speed up encoding, the video encoder 110 sends another reconfiguration request to the resource controller 112 indicating a desired resource allocation with only one additional virtual processor ($P_3$), thus, requesting an allocation of three processors ($P_1$, $P_2$, $P_3$) in total. In this example, the resource controller 112 replies with a reconfiguration offer which comprises three processors and indicates a runtime reconfiguration as the possible possible reconfiguration scheme. In this case, the video encoder 110 accepts the reconfiguration offer and—after detecting the availability of the third virtual processor ($P_3$) in the virtual machine 104—the video encoder 110 starts a third thread for processing the HD video data. In fact, processing is then not handled in real time, but this is not crucial because the video encoder 110 performs offline encoding (and not live encoding).

Further, while processing the HD video data continues, the video encoder 110 receives a notification from the resource controller 112 indicating that a fourth processor (or a fourth processor core, respectively) became available at the underlying computing host 102. The video encoder 110 thus sends a reconfiguration request to the resource controller 112 indicating a desired resource allocation comprising one additional virtual processor ($P_4$), thus, requesting an allocation of four processors ($P_1$, $P_2$, $P_3$, $P_4$) in total. The resource controller 112 now replies with a reconfiguration offer which comprises four processors and indicates a runtime reconfiguration as the possible reconfiguration scheme. In this case, the video encoder 110 accepts the reconfiguration offer and—after detecting the availability of the fourth virtual processor ($P_4$) in the virtual machine 104—the video encoder 110 starts a fourth thread for processing the remainder of the HD video data. The processing speed is now at real-time.

In a second example, the application 110 is a video encoder that performs live encoding. The video encoder 110 receives compressed video data on a multicast IP (Internet Protocol) socket (resource $M_1$), encodes the video data and sends the compressed video data to a multicast IP address (resource $M_2$).

Similar to the first example, a first part of the video data is provided in SD resolution and a second part of the video data is provided in HD resolution. It is again assumed that the current allocation for the virtual machine 104 comprises two virtual processors ($P_1$, $P_2$) which allow processing the SD part of the video in real time. Four threads are required, however, to keep the processing speed at real-time for processing the HD part of the video.

The video encoder 110 therefore sends a reconfiguration request to the resource controller 112 indicating a desired resource allocation comprising two additional virtual processors ($P_3$, $P_4$), thus, requesting an allocation of four processors ($P_1$, $P_2$, $P_3$, $P_4$) in total. In this example, the resource controller 112 replies with a reconfiguration offer which comprises four processors and indicates a live migration as the possible reconfiguration scheme. The video encoder 110, in turn, determines that all resources it uses (particularly, $M_1$, $M_2$) are migratable and, therefore, accepts the reconfiguration offer. Live migration of the virtual machine 104 is then performed and—after detecting the availability of the third and fourth processor ($P_3$, $P_4$) in the virtual machine 104—the video encoder 110 starts a third and fourth thread for processing the HD video data in real time.

In a third example, the application 110 is a high performance packet processing application program. The packet processing application 110 comprises a packet receiving thread that spins continuously to pick packets that arrive at an inbound virtual network interface of the virtual machine 104. The thread is executed on a virtual processor ($P_V$) provided to the virtual machine 104. An additional packet receiving thread spinning to pick packets from a corresponding physical network interface is executed by an application program running on the underlying computing unit 102 itself, i.e., outside of the virtual machine 104. This thread is executed on a logical processor ($P_L$) on a physical processor core of the underlying computing unit 102. In this example, the packet processing application 110 knows that improved performance can be achieved if its own packet receiving thread is executed on the same physical processor core as the packet receiving thread running outside of the virtual machine 104 (just on another logical core) because then the two threads can use the same cache memory.

Since the packet processing application 110 cannot determine this information on the local level (information on the thread running outside the virtual machine 104 is not accessible from within the virtual machine 104), the packet processing application 110 queries the virtual machine configuration database 116 in order to find out about the mapping of the virtual processors assigned to the virtual machine 104 to logical processors of the underlying computing unit 102. If, based on the information received from the virtual machine configuration database 116, the packet processing application 110 determines that the two threads are executed on different processor cores, the packet processing application 110 sends a reconfiguration request to the resource controller 112 indicating a desired resource allocation in which its virtual processor ($P_V$) is mapped to a logical processor core on the same physical processor core as the packet receiving thread running outside the virtual machine 104. The resource controller 112 replies with a reconfiguration offer indicating a corresponding (fully satisfying) possible resource allocation and indicating a runtime reconfiguration as the possible reconfiguration scheme. The packet processing application 110 accepts the reconfiguration offer accordingly and continues to run with higher performance.

In a fourth example, the application 110 is a high priority application program that is executed on a computing unit 102 whose resources are fully (or almost fully) utilized by a plurality of virtual machines 104 being executed on the computing unit 102. In such a case, an allocation of additional resources to the virtual machine 104 on which the application 110 is executed cannot be fulfilled without releasing resources of other virtual machines 104 being executed on the same computing unit 102 or without performing a live migration on one of the virtual machines 104.

In this example, the high priority application 110 sends a reconfiguration request to the resource controller 112 indicating a desired allocation comprising, for example, an additional virtual processor, and indicating a runtime reconfiguration as the desired reconfiguration scheme (thus, indicating that no live migration is desired). The resource controller 112 then determines that the reconfiguration request can be satisfied only if one or more other virtual machines 104 being executed on the same computing unit 102 are scaled down, i.e., release some of their allocated resources. The resource controller 112 thus sends a notification to another application 110 being executed on another virtual machine 104 (but being executed on the same computing unit 102) indicating a resource availability change and a suggested resource allocation for the other virtual machine 104. In this example, the other application 110 replies with a reconfiguration acknowledgment indicating acceptance of the suggested resource allocation. The resource controller 112 then triggers reconfiguration of the other virtual machine 104 accordingly. Since now sufficient resources have been released for satisfying the desired allocation of the high priority application 110, the resource controller 112 replies to the high priority application 110 with a reconfiguration offer indicating a (fully satisfying) possible resource allocation and indicating a runtime reconfiguration as the possible reconfiguration scheme. The high priority application 110 accepts the reconfiguration offer accordingly and continues to run with higher performance.

In a variant of this example, it may be possible that the other application 110 denies acceptance of the suggested resource allocation. The resource controller 112 may then send a notification to still further applications 110 in the same manner until one of them accepts (or more of them except accept in sum) a corresponding resource release to satisfy the desired application by the high priority application 110. In case none of the other applications 110 accepts a resource release, the resource controller 112 may perform live migration on one or more of the other virtual machines 104.

As has become apparent from the above embodiments, reconfiguration of a virtual machine can be initiated and controlled by an application that is executed on the virtual machine to be reconfigured. The application generally has best knowledge of its future resource requirements and can therefore achieve a faster reaction time to dynamic workload changes. For example, the application may know about a workload change already before such change takes place and is not dependent on external workload measurements. The application can react timely by allocating more resources or releasing excess resources and, in this way, reduce resource overbooking, avoid performance loss and increase resource utilization.

The application can negotiate the reconfiguration of the underlying virtual machine itself and can request a desired reconfiguration which can be decided at runtime.

Further, the application has in certain variants control of the reconfiguration scheme to be applied itself and even special requirements with regard to a physical to virtual resource mapping of the application may be considered. The cloud computing environment does not always need to have any knowledge about applications executed in the cloud and only needs to keep track of which resources are available or allocated. A notification from the resource controller can enable that the application to dynamically react to global or local resource availability changes.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only is by the scope of the claims that follow.

The invention claimed is:

1. A method for triggering reconfiguration of a virtual machine hosted by a computing unit in a cloud computing environment, the method comprising:
   receiving a reconfiguration request from an application being executed on the virtual machine in the cloud computing environment, the reconfiguration request indicating a desired resource allocation for the virtual machine and further indicating a desired reconfiguration scheme for reconfiguring the virtual machine;
   selecting a possible reconfiguration scheme to conform to the desired reconfiguration scheme, based on determining whether sufficient resources are available on the computing unit for satisfying the desired resource allocation;
   sending a reconfiguration response to the application, the reconfiguration response including a reconfiguration offer indicating a possible resource allocation for the virtual machine and the selected possible reconfiguration scheme;
   receiving a reconfiguration acknowledgement from the application indicating acceptance of the reconfiguration offer; and
   triggering reconfiguration of the virtual machine so as to allocate resources to the virtual machine according to the accepted reconfiguration offer.

2. The method of claim 1, wherein the method is performed by a resource controller configured to control resource allocation to virtual machines in the cloud computing environment.

3. The method of claim 1, wherein the reconfiguration response conditionally includes the reconfiguration offer when the sufficient resources for satisfying the desired resource allocation are available at least in part.

4. The method of claim 1, wherein the reconfiguration response conditionally includes the reconfiguration offer when the desired resource allocation does not exceed a predetermined maximum amount of resources.

5. The method of claim 1, wherein the reconfiguration response conditionally includes the reconfiguration offer when the application has a right to initiate the reconfiguration of the virtual machine.

6. The method of claim 1,
   wherein, if the selected possible reconfiguration scheme corresponds to a runtime reconfiguration, the triggering reconfiguration of the virtual machine comprises instructing a hypervisor having control of the virtual machine to allocate the resources to the virtual machine according to the accepted reconfiguration offer.

7. The method of claim 1,
   wherein, if the selected possible reconfiguration scheme corresponds to a live migration, the triggering reconfiguration of the virtual machine comprises:
      instructing a hypervisor having control of the virtual machine to perform live migration of the virtual machine to transfer control of the virtual machine to a destination hypervisor; and
      instructing the destination hypervisor to allocate the resources to the virtual machine according to the accepted reconfiguration offer.

8. The method of claim 1,
   wherein, if the selected possible reconfiguration scheme corresponds to an offline migration, the triggering reconfiguration of the virtual machine comprises:
      instructing a hypervisor having control of the virtual machine to perform offline migration of the virtual machine to transfer control of the virtual machine to a destination hypervisor; and
      instructing the destination hypervisor to allocate resources to the virtual machine according to the accepted reconfiguration offer.

9. A method for initiating reconfiguration of a virtual machine in a cloud computing environment, the method comprising an application being executed on the virtual machine hosted by a computing unit in the cloud computing environment:
   sending a reconfiguration request to a resource controller configured to control resource allocation to virtual machines in the cloud computing environment, the reconfiguration request indicating a desired resource allocation for the virtual machine and further indicating a desired reconfiguration scheme for reconfiguring the virtual machine;
   receiving a reconfiguration response from the resource controller, the reconfiguration response including a reconfiguration offer indicating a possible resource allocation for the virtual machine and a possible reconfiguration scheme, wherein the possible reconfiguration scheme is selected to conform to the desired reconfiguration scheme, based on determining whether sufficient resources are available on the computing unit for satisfying the desired resource allocation; and
   sending a reconfiguration acknowledgement to the resource controller indicating acceptance of the reconfiguration offer.

10. The method of claim 9, further comprising the application:
    determining, prior to sending the reconfiguration request, a current local-level resource allocation for the virtual machine by querying an operating system in which the application is executed; and
    generating the reconfiguration request based on the current local-level resource allocation.

11. The method of claim 9, further comprising the application:
    determining, prior to sending the reconfiguration request, a current cloud-level resource allocation relating to the virtual machine by querying a virtual machine configuration database configured to store information about resources allocated to virtual machines in the cloud computing environment; and
    generating the reconfiguration request based on the current cloud-level resource allocation.

12. A resource controller for triggering reconfiguration of a virtual machine hosted by a computing unit in a cloud computing environment, the resource controller comprising:
    processing circuitry;
    memory containing instructions executable by the processing circuitry whereby the resource controller is operative to:
       receive a reconfiguration request from an application being executed on the virtual machine in the cloud computing environment, the reconfiguration request indicating a desired resource allocation for the virtual machine and further indicating a desired reconfiguration scheme for reconfiguring the virtual machine;
       select a possible reconfiguration scheme to conform to the desired reconfiguration scheme, based on a determination that whether sufficient resources are available on the computing unit to satisfy the desired resource allocation;

send a reconfiguration response to the application, the reconfiguration response including a reconfiguration offer indicating a possible resource allocation for the virtual machine and the selected possible reconfiguration scheme;

receive a reconfiguration acknowledgement from the application indicating acceptance of the reconfiguration offer; and trigger reconfiguration of the virtual machine so as to allocate resources to the virtual machine according to the accepted reconfiguration offer.

13. The resource controller of claim 12, wherein the reconfiguration response conditionally includes the reconfiguration offer when the sufficient resources for satisfying the desired resource allocation are available at least in part.

14. A computing unit for initiating reconfiguration of a virtual machine hosted by the computing unit in a cloud computing environment, the computing unit comprising:

processing circuitry; and memory containing instructions belonging to an application being executed on the virtual machine in the cloud computing environment, the instructions executable by the processing circuitry whereby the computing unit is operative to:

send a reconfiguration request to a resource controller configured to control resource allocation to virtual machines in the cloud computing environment, the reconfiguration request indicating a desired resource allocation for the virtual machine and further indicating a desired reconfiguration scheme for reconfiguring the virtual machine;

receive a reconfiguration response from the resource controller, the reconfiguration response including a reconfiguration offer indicating a possible resource allocation for the virtual machine and a possible reconfiguration scheme, wherein the possible reconfiguration scheme is selected to conform to the desired reconfiguration scheme, based on a determination that whether sufficient resources are available on the computing unit to satisfy the desired resource allocation; and send a reconfiguration acknowledgement to the resource controller indicating acceptance of the reconfiguration offer.

15. The computing unit of claim 14, wherein the instructions are such that the computing unit is operative to determine, prior to sending the reconfiguration request, a current local-level resource allocation for the virtual machine by querying an operating system in which the application is executed; and generate the reconfiguration request based on the current local-level resource allocation.

16. The computing unit of claim 14, wherein the instructions are such that the computing unit is operative to:

determine, prior to sending the reconfiguration request, a current cloud-level resource allocation relating to the virtual machine by querying a virtual machine configuration database configured to store information about resources allocated to virtual machines in the cloud computing environment; and generate the reconfiguration request based on the current cloud-level resource allocation.

* * * * *